(12) United States Patent
Hsieh

(10) Patent No.: US 7,631,616 B2
(45) Date of Patent: Dec. 15, 2009

(54) AQUARIUM

(75) Inventor: Chin-Hui Hsieh, Taipei County (TW)

(73) Assignee: Hi-Q Bio-Tech International Ltd., Taipei County (TW)

( * ) Notice: Subject to any disclaimer, the term of this patent is extended or adjusted under 35 U.S.C. 154(b) by 57 days.

(21) Appl. No.: 11/933,442

(22) Filed: Nov. 1, 2007

(65) Prior Publication Data

US 2009/0114163 A1    May 7, 2009

(51) Int. Cl.
*A01K 63/04*    (2006.01)

(52) U.S. Cl. ...................................... 119/260; 119/259

(58) Field of Classification Search ................. 119/259, 119/260, 261, 262, 245, 246, 247, 248, 257, 119/268; 210/416.1, 416.2, 167.01, 167.21
See application file for complete search history.

(56) References Cited

U.S. PATENT DOCUMENTS

| | | | | |
|---|---|---|---|---|
| 4,863,594 A | * | 9/1989 | Pedretti | 210/167.22 |
| 4,957,623 A | * | 9/1990 | Henzlik | 210/167.23 |
| 5,108,594 A | * | 4/1992 | Giovanetti et al. | 210/151 |
| 5,306,421 A | * | 4/1994 | Weinstein | 210/151 |
| 6,276,302 B1 | * | 8/2001 | Lee | 119/260 |
| 7,311,822 B2 | * | 12/2007 | Hochgesang et al. | 210/167.21 |
| 2006/0102537 A1 | * | 5/2006 | Hochgesang et al. | 210/169 |
| 2009/0056638 A1 | * | 3/2009 | Ting | 119/248 |

FOREIGN PATENT DOCUMENTS

| | | | |
|---|---|---|---|
| GB | 2239402 | * | 3/1991 |
| JP | 2000050761 | * | 2/2000 |

* cited by examiner

*Primary Examiner*—T. Nguyen
(74) *Attorney, Agent, or Firm*—Leong C. Lei

(57) ABSTRACT

The aquarium creates a smooth circulation of water flowing through mechanical, biological, and chemical filtration mechanisms. The three filtration mechanisms are housed in a vertical first compartment and a vertical second compartment, both along a back side of the aquarium body, and a lateral third compartment along a bottom side of the body, respectively. A water pump draws water from the third compartment into the second compartment. After a first filtration processes, the water is poured back into the body. Due to the suction of the water pump, water flows from the body into the second compartment to undergo a second filtration process and then enters the third compartment, where a third filtration process is conducted. The water is finally drawn into the second compartment to complete the circulation.

12 Claims, 4 Drawing Sheets

AQUARIUM

TECHNICAL FIELD OF THE INVENTION

The present invention generally relates to aquaria, and more particularly to an aquarium providing hidden mechanical, biological, and chemical filtration mechanisms.

DESCRIPTION OF THE PRIOR ART

A conventional aquarium or fish tank 1, as shown in FIG. 1, contains a hollow body 11 made of a transparent material (such as glass or high-strength plastic) for holding water and water-dwelling animals, a filtration assembly 13, a water pump 12 and an air pump 14. Inside the body 11, sands and stones 15 for landscaping are usually arranged at the bottom.

The water pump 12 draws the tank water via an intake pipe 121 into the filtration assembly 13 through an outlet pipe 122. The filtration assembly 13 contains a number of filtration elements 131 such as cotton filter, active carbon to remove the residual feeds and droppings of the water-dwelling animals in the tank water. The filtered tank water is then sent back into the body 11 through an outlet pipe 132. On the other hand, the air pump 14 draws the outside fresh air and pump the air into the tank water through an air pipe 141, usually buried in the sands 15, to increase the dissolved oxygen content of the tank water.

The conventional aquarium 1 has a number of disadvantages. First, when the aquarium 1 has a large body 11 and holds a sizable amount of water, the water pump 12 may be inadequate to produce enough water circulation and therefore anaerobes are prone to breed. When the amount of anaerobes is above 0.1 ppm, the health of the water-dwelling animals may be affected.

Secondly, the conventional way of arranging the filtering elements 131 provides limited contact between the tank water and the filtering elements 131. The function of the filtering elements 131 is not fully explored and the tank water is not well filtered. As a result the tank water has to be replaced frequently, which is a tedious work and sometimes the water-dwelling animal is hurt in the process.

Additionally, the filtration assembly 13 is usually positioned on top of the body 11, which not only takes up considerable space but also in some extent affects the appearance of the aquarium 1.

SUMMARY OF THE INVENTION

Accordingly, a novel aquarium is provided herein, which creates a smooth circulation of water flowing through mechanical, biological, and chemical filtration mechanisms to maintain the quality of the tank water for an extended period of time. The three filtration mechanisms are hidden for enhanced appearance of the aquarium.

The three filtration mechanisms are housed in a vertical first compartment and a vertical second compartment, both along a back side of the aquarium body, and a lateral third compartment along a bottom side of the body, respectively. The three compartments are sealed by partition plates so that they are hidden and separated from the rest of the body. An extended winding path is created in the third compartment. A water pump draws water from the path into the first compartment. After a first filtration processes, the water is poured back into the body from above to create splashes and thereby increase oxygen content of the water. The interior of the second compartment is conducted to the body and the third compartment. Therefore, due to the suction of the water pump, water flows from the body into the second compartment to undergo a second filtration process and then enters the path of the third compartment, where a third filtration process is conducted. The water is finally drawn into the second compartment to complete the circulation.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
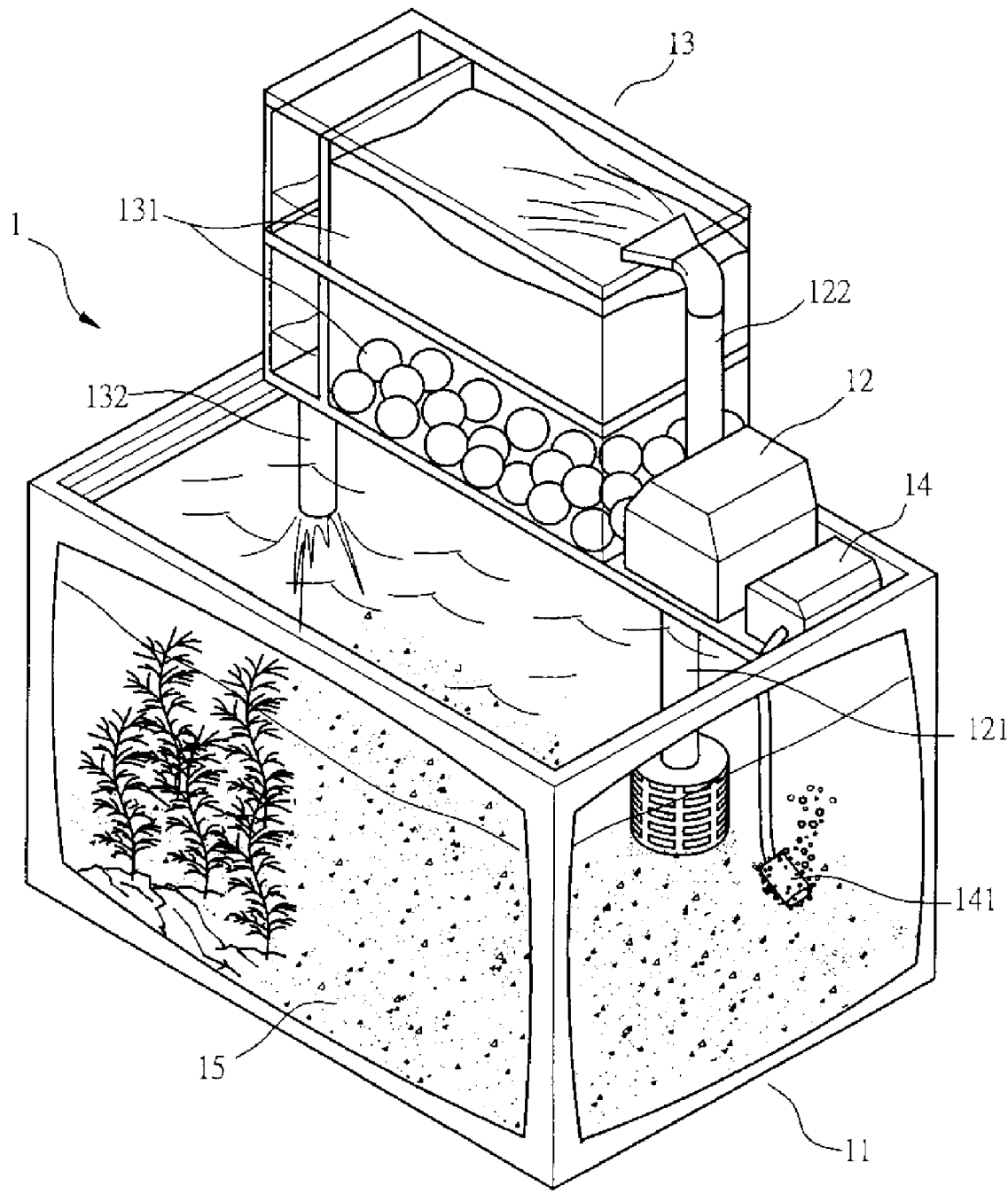
FIG. 1 is a perspective view showing a conventional aquarium.
Figure 2:
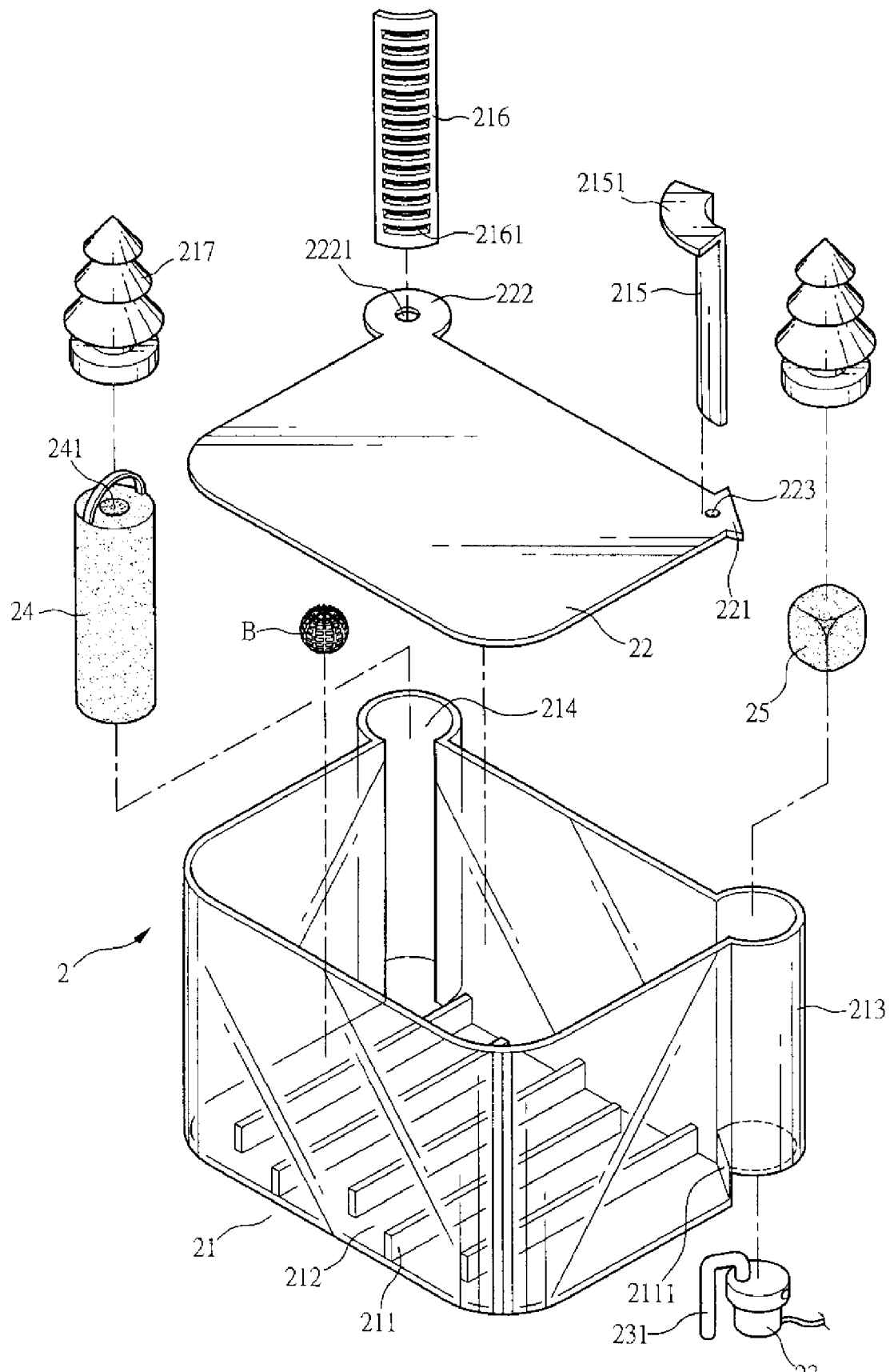
FIG. 2 is a perspective view showing the various components of an aquarium according to an embodiment of the present invention.
Figure 3:
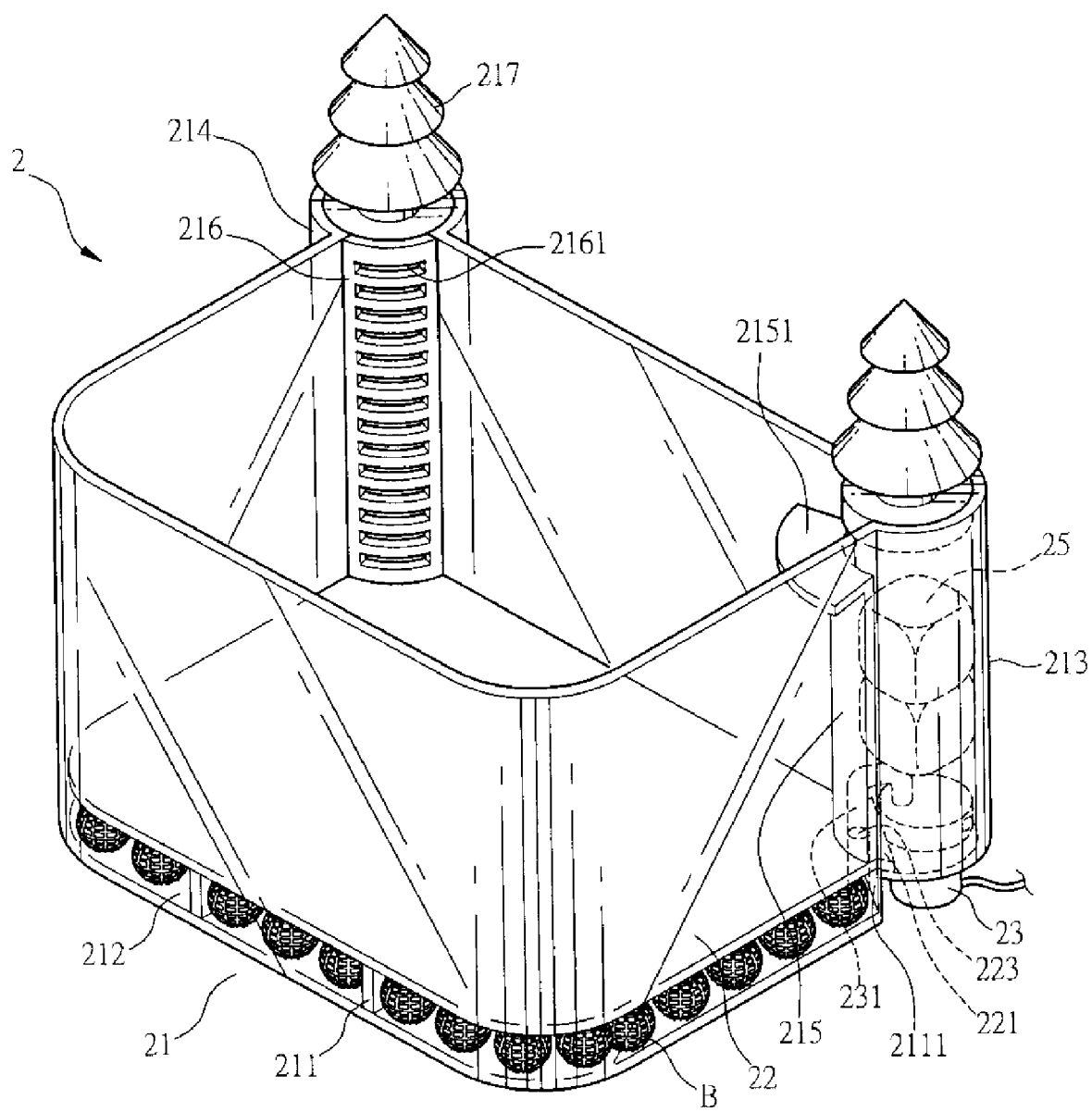
FIG. 3 is a perspective view showing the aquarium of FIG. 2 after it is assembled.
Figure 4:
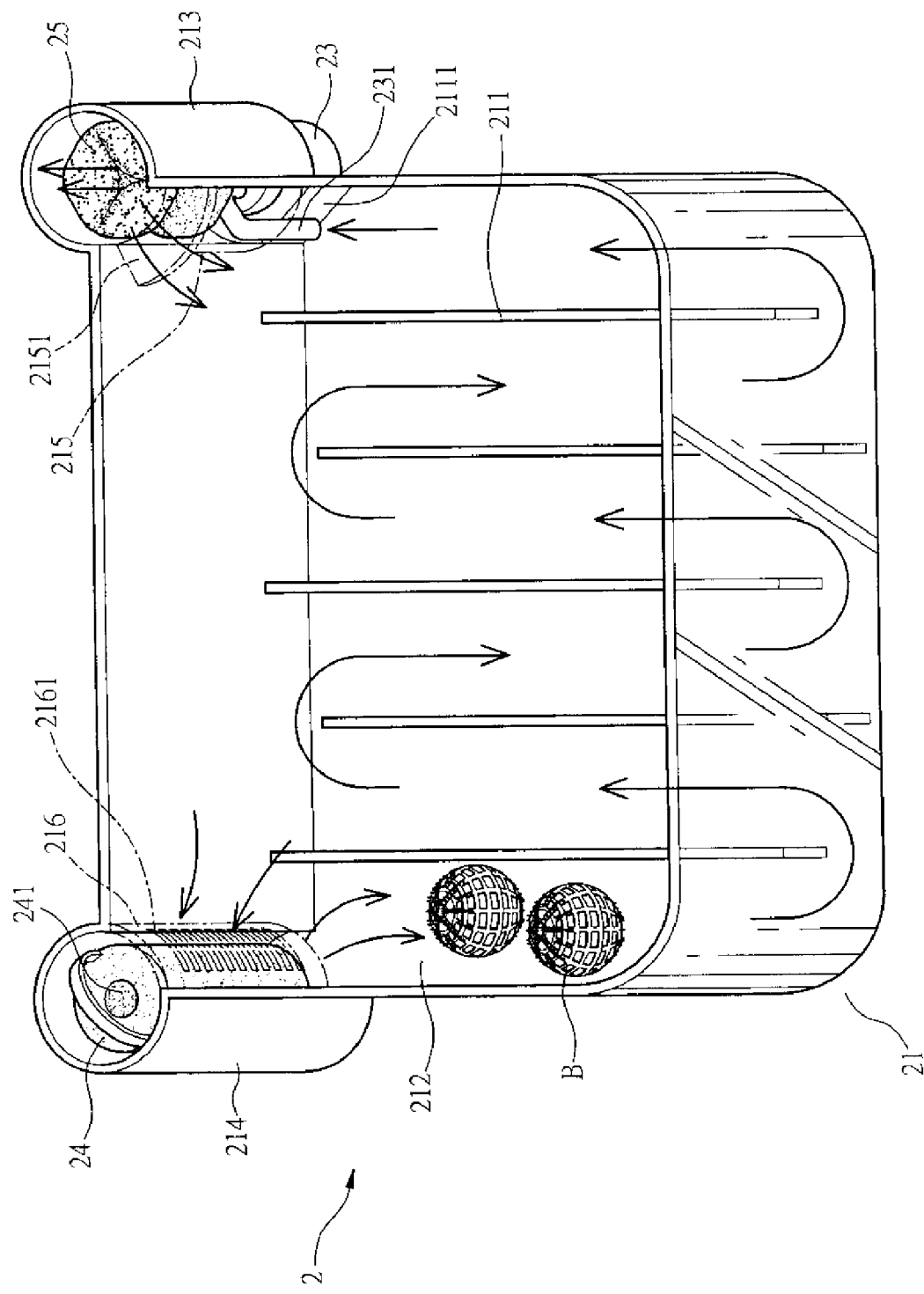
FIG. 4 is a schematic view showing the circulation of water through the aquarium of FIG. 2.

As shown in FIGS. 2 and 3, an aquarium 2 according to an embodiment of the present invention contains a hollow body 21.

The body 21 has a top opening (not numbered). On a bottom surface of the body 21, a number of elongated and narrow strips 211 are raised vertically and staggered in parallel to form a winding path 212. Along the path 212, a number of biological filtering elements B are positioned to provide biological filtration to the water flowing through the path 212.

Along a back side of the body 21, a vertical and cylindrical first compartment 213 and a vertical and cylindrical second compartment 214, each having a top opening, are provided. The internal space of the first compartment 213 is connected to the internal space of the body 21 via a vertical and elongated first opening (not numbered). Similarly, the internal space of the second compartment 214 is connected to the internal space of the body 21 via a vertical and elongated second opening (not numbered).

A partition plate 22 is positioned laterally on top of the strips 211 to completely seal the biological filtering elements B, the path 212, and the strips 211 from the rest of the internal space of the body 21. The sands for landscaping therefore can be positioned on a top surface of the partition plate 22. In other words, the partition plate 22 creates a lateral compartment along the bottom surface of the body 21 to house a biological filtration mechanism.

The partition pate 22 has a first ear 221 that extends into the first compartment 213. Please note that the first compartment 213 has a bottom side substantially at the same height as the partition plate 22. The first ear 221 therefore is substantially overlaid on a bottom surface of the first compartment 213. A partition plate 215 with a top flange 2151 extending towards the interior of the body 21 is positioned at the first opening between the first compartment 213 and the body 21, thereby separating the first compartment 213 from the body 21. In a lower section of the partition plate 215, a through hole (not numbered) is provided. A water pump 23 is installed at the bottom side of the first compartment 213. The water pump 23 has an inversed-U shaped inlet pipe (not numbered) that extends through the through hole of the partition plate 215, a through hole 223 on the partition plate 22, and finally into the path 212. As such, water can be drawn from the path 212 and into the first compartment 213 via an outlet hole (not numbered) by the water pump 23.

The partition pate 22 has a second ear 222 that extends into the second compartment 214. Please note that the second compartment 214 has a height substantially identical to that of the body 21 and the second ear 222 therefore also partitions the internal space of the second compartment 214 into two halves. The two halves are connected by a through hole 2221 of the second ear 222. A partition plate 216 with a number of through narrow windows 2161 is positioned at the second opening above the second ear 222 to separate the second compartment 214 and the body 21. Therefore, the top half of the internal space of the second compartment 214 is connected to the internal space of the body 21 via the windows 2161. Additionally, as such, water can be drawn into the path 212 via the windows 2161 and the through hole 2221 of the second ear 222. The windows 2161 are small enough to prevent water-dwelling animals to swim into the second compartment 214. For appealing sake, decoration pieces 217 are installed on a top side of the first and second compartments 213 and 214, respectively.

A number of chemical filtering elements 25, such as active carbon and zeolite, are housed inside the first compartment 213 above the water pump 23. On the other hand, at least a cylindrical mechanical filtering element 24 made of filter cotton or a porous material is housed inside the second compartment 214. The mechanical filtering element 24 has a vertical through channel 241 with a bottom end aligned with the through hole 2221 of the second ear 222.

When the body 21 is filled with water and the water pump 23 is turned on, the water in the body 21 flows through the windows 2161 into the second compartment 214 due to the suction of the water pump 23. The water then undergoes a mechanical filtration process in the second compartment 214 before flowing into the path 212 via the channel 241 and the through hole 2221 of the second ear 222. The water then undergoes a biological filtration process along the path 212 before the water is drawn into the first compartment 213 via the inlet pipe by the water pump 23. The water then is forced upwards and further undergoes a chemical filtration process before the water flows back into the body 21 over the flange 2151. As the water hits the water surface of the body 21, splashes are created and the oxygen content of the water is thereby increased.

The aquarium 2 of the present invention has a number of advantages. First, an extended path 212 is provided to allow the water to undergo extensive biological filtration. In the mean time, the winding path 212 covering the entire bottom surface of the body 21 to prevent any dead space. Secondly, in addition to the extensive biological filtration, the aquarium 2 also provides mechanical and chemical filtrations so that the quality of the water is maintained over an extended period of time without water changes. Thirdly, the filtering elements 24 and 25 are hidden inside the second and first compartments 214 and 213 so as to achieve much appealing appearance. The replacement of the filtering elements 24 and 25 can be conducted easily by removing them from the second and first compartments 214 and 213. The body 21 is usually made of a transparent material so that it is completely transparent. In alternative embodiments, only the portion of the body 21 above the partition plate 22 is transparent.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An aquarium, comprising:
    a body having a vertical first compartment and a vertical second compartment, both along a back side of said body, and a lateral third compartment along a bottom side of said body, said third compartment being separated from said body by a third partition plate, said first compartment being conducted to said body, said second compartment being conducted to said third compartment and said body, said third compartment having a winding path for water to flow through, said third partition plate having an ear extending into said second compartment to separate said second compartment into a top half and a bottom half;
    a first filtration mechanism, a second filtration mechanism, and a third filtration mechanism housed inside said first, second, and third compartments, respectively; and
    a water pump positioned on a bottom side of said first compartment, said water pump drawing water from said winding path of said third compartment through said third partition plate into said first compartment;
    wherein, when said water pump is turned on, a circulation of water is created where water flows from said body into said second compartment to undergo a filtration process by said second filtration mechanism, through said winding path of said third compartment to undergo another filtration process by said third filtration mechanism, into said second compartment to undergo yet another filtration process by said first filtration mechanism, and finally back into said body.

2. The aquarium according to claim 1, wherein said first compartment and said body are separated by a first partition plate.

3. The aquarium according to claim 2, wherein said first partition plate has a flange extending from a top side of said first partition plate towards said body where water is poured back into said body over said flange.

4. The aquarium according to claim 1, wherein said second compartment and said body are separated by a second partition plate.

5. The aquarium according to claim 4, wherein said second partition plate has a plurality of through windows to conduct said second compartment to said body.

6. The aquarium according to claim 1, wherein a decoration piece is installed on a top side of at least one of said first and second compartments.

7. The aquarium according to claim 1, wherein said third filtration mechanism contains a plurality of biological filtering elements.

8. The aquarium according to claim 1, wherein said second filtration mechanism contains at least a mechanical filtering element.

9. The aquarium according to claim 1, wherein said first filtration mechanism contains a plurality of chemical filtering elements.

10. The aquarium according to claim 9, wherein said chemical filtering element is made of one of active carbon and zeolite.

11. The aquarium according to claim 1, wherein said bottom half is conducted to said third compartment, and said ear has a through hole so that said top half is conducted to said bottom half.

12. The aquarium according to claim 1, wherein said water pump has an inlet pipe extending into said winding path of said third compartment via a through hole on said third partition plate.

* * * * *